(12) United States Patent
Suzuki

(10) Patent No.: US 10,705,778 B2
(45) Date of Patent: Jul. 7, 2020

(54) INFORMATION PROCESSING APPARATUS, IMAGE FORMING APPARATUS, AND COMPUTER-READABLE MEDIUM

(71) Applicant: Junji Suzuki, Kanagawa (JP)

(72) Inventor: Junji Suzuki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/354,219

(22) Filed: Mar. 15, 2019

(65) Prior Publication Data
US 2019/0286395 A1  Sep. 19, 2019

(30) Foreign Application Priority Data
Mar. 19, 2018 (JP) ................. 2018-051759

(51) Int. Cl.
*H04N 1/00* (2006.01)
*G06F 3/12* (2006.01)

(52) U.S. Cl.
CPC .......... *G06F 3/1248* (2013.01); *G06F 3/1208* (2013.01); *G06F 3/1247* (2013.01); *G06F 3/1286* (2013.01)

(58) Field of Classification Search
CPC .... G06F 3/1286; G06F 3/1247; G06F 3/1208; G06F 3/1248
USPC ....................................... 358/1.15
See application file for complete search history.

(56) References Cited

U.S. PATENT DOCUMENTS

| | | | | |
|---|---|---|---|---|
| 2002/0067502 A1* | 6/2002 | Hansen | .................. | B42C 19/02 358/1.15 |
| 2011/0085190 A1* | 4/2011 | Michel | .................. | G06F 3/1203 358/1.9 |
| 2015/0116779 A1* | 4/2015 | Shibuya | ............... | H04N 1/6036 358/2.1 |

FOREIGN PATENT DOCUMENTS

JP          4183557          9/2008

OTHER PUBLICATIONS

U.S. Appl. No. 16/123,178, filed Sep. 6, 2018.

* cited by examiner

*Primary Examiner* — Saeid Ebrahimi Dehkordy
(74) *Attorney, Agent, or Firm* — Oblon, McClelland, Maier & Neustadt, L.L.P.

(57) ABSTRACT

An information processing apparatus includes circuitry configured to perform: extracting, as a common object, an object commonly referred to on a plurality of pages, from a file including data of a plurality of pages and positional information indicating positions of the data of the plurality of pages; determining whether to define the common object extracted at the extracting as an object to be commonly used on the plurality of pages or to define the common object on each of the plurality of pages; reconstructing data by arranging the object based on a determination result at the determining; and transmitting the data reconstructed at the reconstructing to an image forming apparatus.

9 Claims, 17 Drawing Sheets

| 1 0 obj |
| 2 0 obj<</font 31 0 R>> |
| ... |
| 10 0 obj |
| 11 0 obj |
| 12 0 obj<</font 31 0 R>> |
| ... |
| 20 0 obj |
| 21 0 obj |
| 22 0 obj<</font 31 0 R>> |
| ... |
| 30 0 obj |
| 31 0 obj<<DEFINITION OF FONT>> |

DATA SIZE=
Sum(1 0 obj:30 0 obj)+31 0 obj

| 1 0 obj |
| 2 0 obj<</font 31 0 R>> |
| ... |
| 10 0 obj |
| 31 0 obj<<DEFINITION OF FONT>> ~f1 |

| 11 0 obj |
| 12 0 obj<</font 31 0 R>> |
| ... |
| 20 0 obj |

| 21 0 obj |
| 22 0 obj<</font 31 0 R>> |
| ... |
| 30 0 obj |

DATA SIZE=
Sum(1 0 obj:30 0 obj)+1×31 0 obj

INFORMATION PROCESSING APPARATUS, IMAGE FORMING APPARATUS, AND COMPUTER-READABLE MEDIUM

CROSS-REFERENCE TO RELATED APPLICATIONS

The present application claims priority under 35 U.S.C. § 119 to Japanese Patent Application No. 2018-051759, filed on Mar. 19, 2018. The contents of which are incorporated herein by reference in their entirety.

BACKGROUND OF THE INVENTION

1. Field of the Invention

The present invention relates to an information processing apparatus, an image forming apparatus, and a computer-readable medium.

2. Description of the Related Art

A portable document format (PDF) file has been widely used as a format of electronic documents, and an image forming apparatus, such as a multifunction peripheral printer/product (MFP), is able to directly receive and print a PDF file. However, while files written in other printer languages, such as a printer control language (PCL) and a postscript (PS), have formats that allow sequential processing on received files, the PDF file has a format that allows random access to objects included in the file, and therefore, the received PDF file is once stored in a storage and thereafter printed. In addition, in PDF printing, it is necessary to perform a printing process on a first page after storing a PDF file in a storage once; therefore, it is necessary to wait for at least the time taken to receive the file until paper ejection is started.

For example, Japanese Patent No. 4183557 discloses a process in which, when a PDF file is to be printed, the PDF file is divided into pages before being transmitted to a printing apparatus such that a data transfer time and a rasterizing time of the PDF file are overlapped, to thereby provide a print-out to a user in a short time. According to the technology disclosed in Japanese Patent No. 4183557, the PDF file is divided and a process is performed page by page, so that it is possible to perform printing while saving a memory.

However, even in the technology disclosed in Japanese Patent No. 4183557 for example, a problem with an increase in a file size due to the division into pages is not solved.

SUMMARY OF THE INVENTION

According to one aspect of the present invention, an information processing apparatus includes circuitry configured to perform: extracting, as a common object, an object commonly referred to on a plurality of pages, from a file including data of a plurality of pages and positional information indicating positions of the data of the plurality of pages; determining whether to define the common object extracted at the extracting as an object to be commonly used on the plurality of pages or to define the common object on each of the plurality of pages; reconstructing data by arranging the object based on a determination result at the determining; and transmitting the data reconstructed at the reconstructing to an image forming apparatus.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
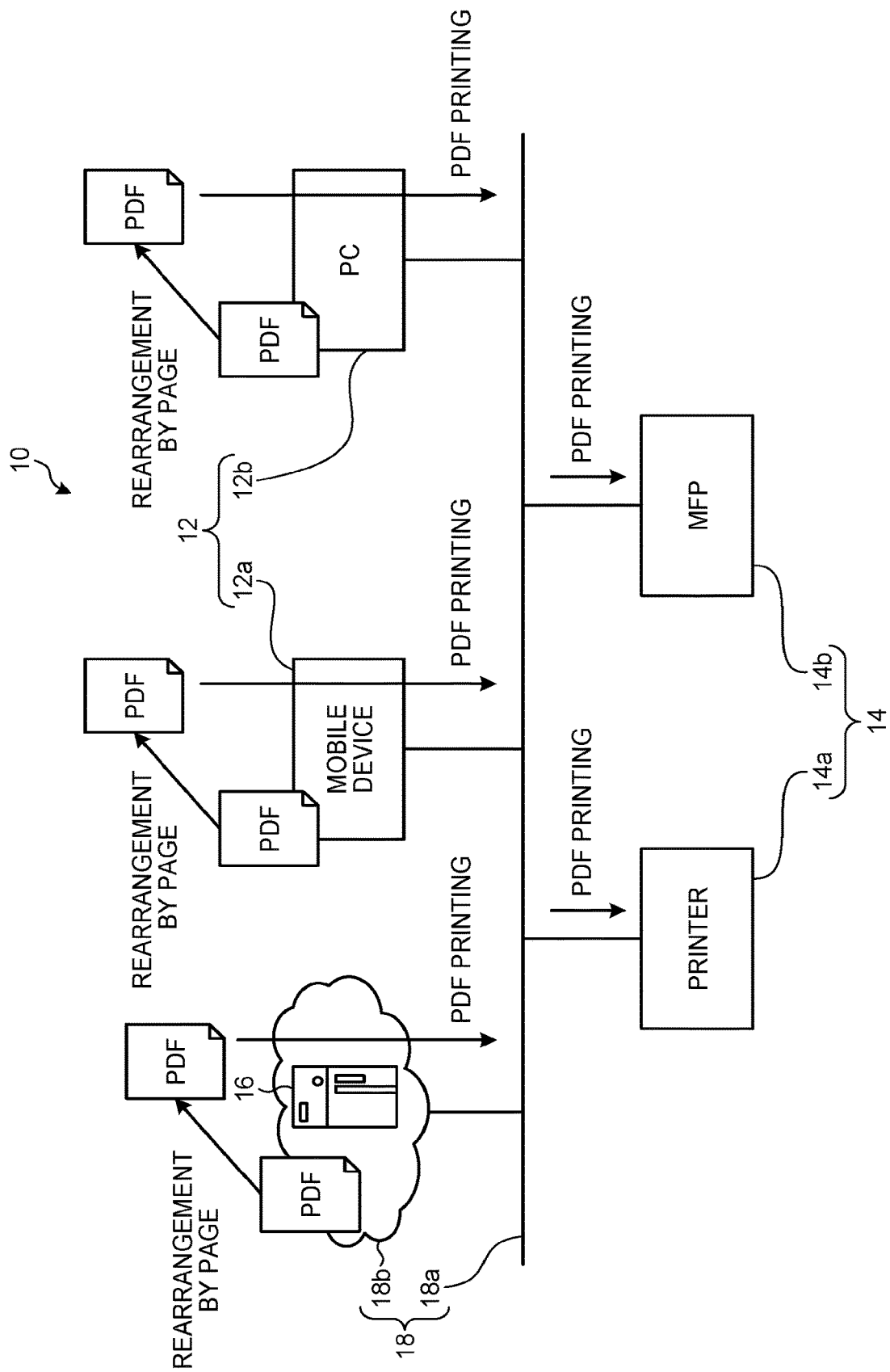
FIG. 1 is a system configuration diagram illustrating an example of a system configuration of an image forming system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing apparatus, an image forming apparatus, and a computer-readable medium capable of reducing a waiting time of a user when receiving a PDF file and performing a printing process.

Exemplary embodiments of the present invention will be described below with reference to the accompanying drawings.

Description of Image Forming System

FIG. 1 is a system configuration diagram illustrating an example of a system configuration of an image forming system 10 according to an embodiment of the present invention. The image forming system 10 includes a mobile device 12a, a personal computer (PC) 12b, a printer 14a, an MFP 14b, and a cloud server 16. The image forming system 10 is one example of an information processing system.

The mobile device 12a and the PC 12b are examples of a terminal device. Hereinafter, an arbitrary one of the mobile device 12a and the PC 12b will be referred to as a terminal device 12. The printer 14a and the MFP 14b are examples of an image forming apparatus. Hereinafter, an arbitrary one of the printer 14a and the MFP 14b will be referred to as an image forming apparatus 14.

The cloud server 16 is an information processing apparatus having a communication function. The cloud server 16 functions as a print server that manages a document file, such as a PDF file, and transmits the document file to the image forming apparatus 14, on the basis of a request from the terminal device 12 or the image forming apparatus 14. Further, the cloud server 16 has a document file conversion function. The number of the cloud servers 16 is not limited to one, and it may be possible to provide a plurality of different servers. The cloud server 16 and the terminal device 12 are examples of an information processing apparatus.

The terminal device 12 and the image forming apparatus 14 are connected to a local area network (LAN) 18a directly or via a wireless LAN router (not illustrated). The terminal device 12 and the image forming apparatus 14 connect to an Internet 18b via the LAN 18a, and connect to the cloud server 16 on the Internet 18b. Hereinafter, an arbitrary one of the LAN 18a and the Internet 18b will be referred to as a communication network 18. Wireless communication, such as wireless fidelity (Wi-Fi) (registered trademark), may be performed in whole or in part of the communication network 18. The communication network 18 is one example of a network.

The terminal device 12 and the cloud server 16 generate a document file, such as a PDF file, in a random access format by using an arbitrary application or driver. The terminal device 12 and the cloud server 16 transmit a print request including the document file to the image forming apparatus 14. The image forming apparatus 14 receives the document file transmitted from the terminal device 12 or the cloud server 16, and performs a printing process.

A wide variety of applications and drivers are applicable to generate PDF files, and they are provided by a function that is provided by an operating system (OS) or applications of the mobile device 12a, applications that run on the PC 12b, a scanner function included in the MFP 14b, and the like, in addition to services provided by the cloud server 16.

When the image forming system 10 prints a PDF file, there may be a case in which a PDF file on the cloud server 16 is specified by the mobile device 12a or the PC 12b and printing is performed after rearranging the PDF file by page, or there may be a case in which a PDF file on the cloud server 16 is specified via an operation panel on the printer 14a or the MFP 14b and printing is performed after rearranging the PDF file by page.

Description of Hardware Configuration

Figure 2:
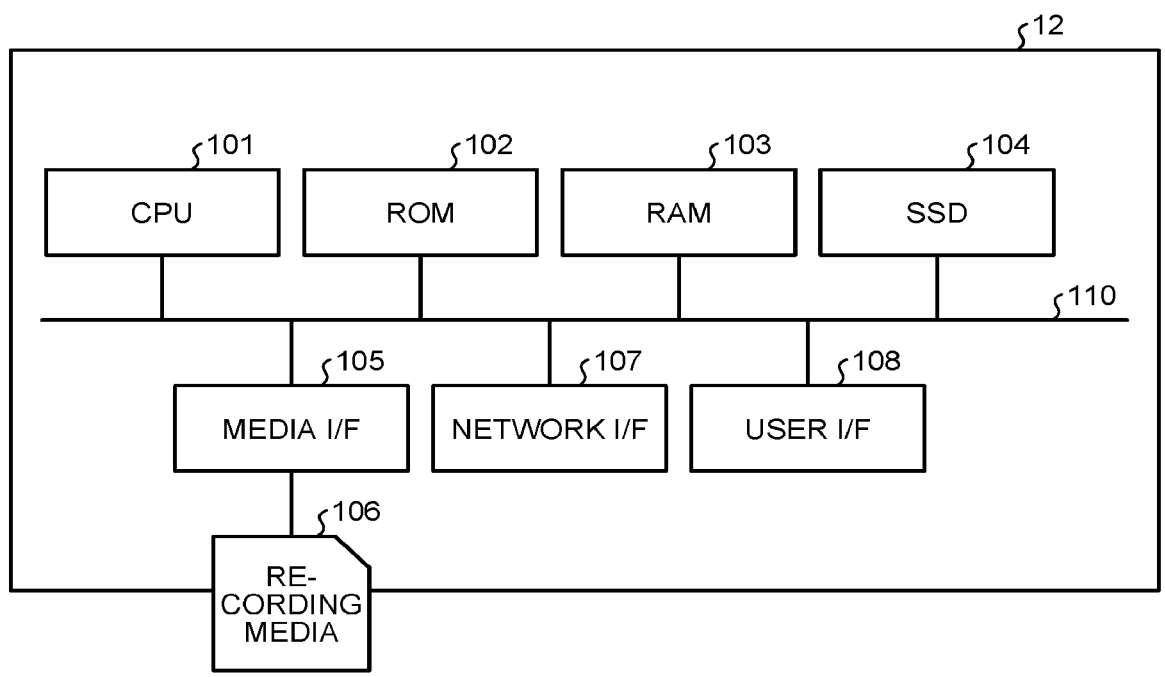
FIG. 2 is a hardware block diagram illustrating an example of a hardware configuration of a terminal device.

FIG. 2 is a hardware block diagram illustrating an example of a hardware configuration of the terminal device 12. The terminal device 12 includes a central processing unit (CPU) 101, a read only memory (ROM) 102, a random access memory (RAM) 103, a solid state drive (SSD) 104, a media interface (I/F) 105, a network I/F 107, a user I/F 108, and a bus line 110.

The CPU 101 controls entire operation of the terminal device 12. The ROM 102 stores therein various programs and applications that run on the terminal device 12. Hereinafter, an application will be simply referred to as an app. The RAM 103 is used as a working area of the CPU 101. The SSD 104 stores therein data used in various programs or apps. The media I/F 105 is an interface for reading information stored in a recording medium 106, such as an external memory, or writing information in the recording medium 106. The network I/F 107 is an interface for performing communication with other devices via the communication network 18 (see FIG. 1). The user I/F 108 is an interface for receiving operation input from the user. The user I/F 108 is, for example, a liquid crystal display device or an organic electro luminescence (EL) display device with a touch panel function, or a keyboard and a mouse. The bus line 110 is an address bus or a data bus for electrically connecting the above-described components as illustrated in FIG. 2.

A hardware configuration of the cloud server 16 is the same as the hardware configuration of the terminal device 12, and therefore, explanation thereof will be omitted. However, the SSD 104 may be replaced with an arbitrary non-volatile storage device, such as a hard disk drive (HDD).

Figure 3:
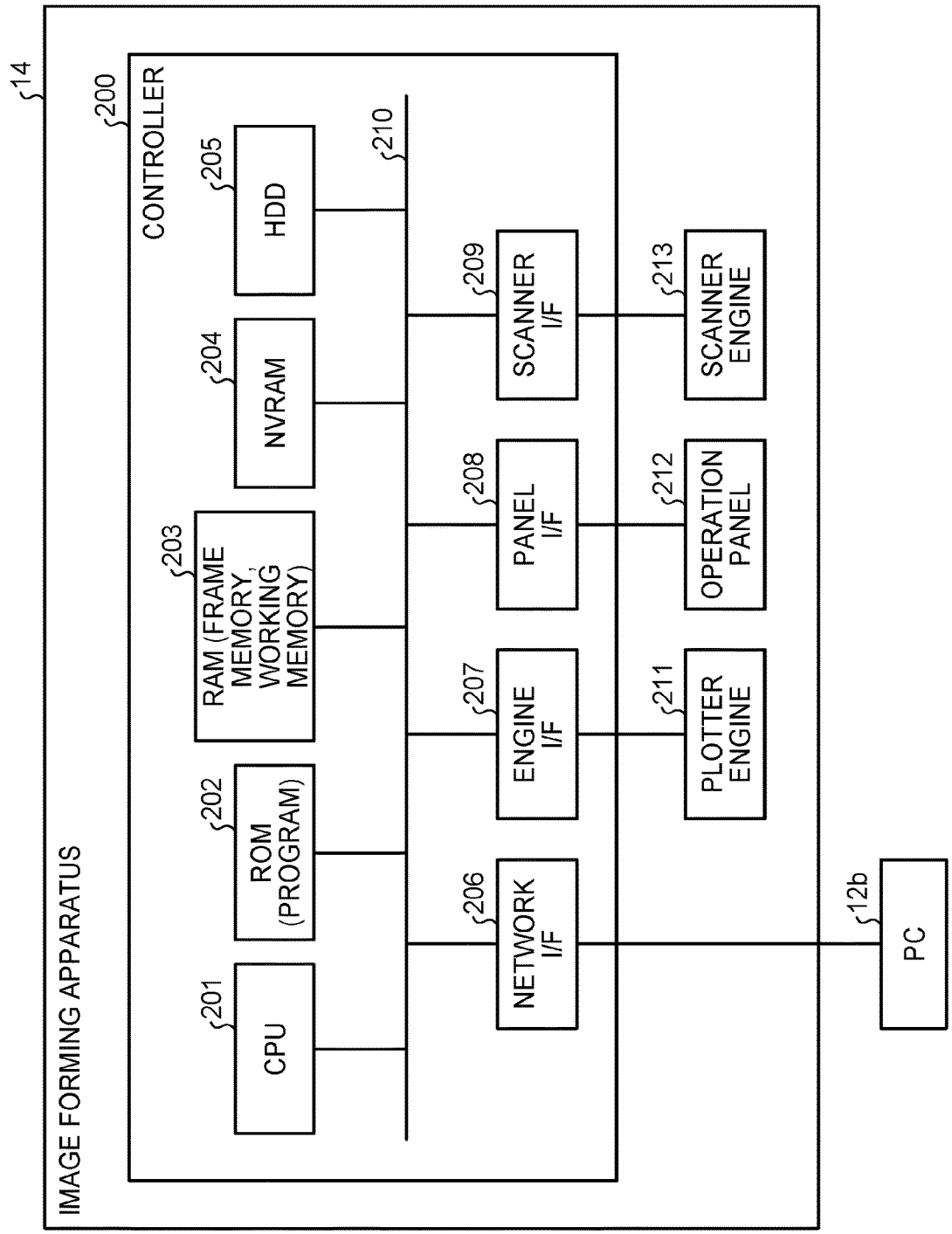
FIG. 3 is a hardware block diagram illustrating an example of a hardware configuration of an image forming apparatus.

FIG. 3 is a hardware block diagram illustrating an example of a hardware configuration of the image forming apparatus 14. The hardware configuration of the image forming apparatus 14 will be described with reference to FIG. 3.

A controller 200 of the image forming apparatus 14 includes a CPU 201, a ROM 202, a RAM 203, a non-volatile RAM (NVRAM) 204, an HDD 205, a network I/F 206, an engine I/F 207, a panel I/F 208, a scanner I/F 209, and a bus line 210. Further, the image forming apparatus 14 includes a plotter engine 211, an operation panel 212, and a scanner engine 213.

The CPU 201 controls entire operation of the image forming apparatus 14. The ROM 202 stores therein various programs and applications that run on the image forming apparatus 14. The RAM 203 is used as a working memory, a frame memory, or the like of the CPU 201. The NVRAM 204 is a non-volatile RAM capable of storing data desired to be held even after power is turned off, and stores therein data used in various programs or applications. The HDD 205 stores therein data used in various programs or applications. The network I/F 206 is an interface for performing communication with other devices, such as the PC 12b (see FIG. 1), via the communication network 18 (see FIG. 1). The engine I/F 207 is an interface for connecting to the plotted engine 211. The panel I/F 208 is an interface for connecting to the operation panel 212. The scanner I/F 209 is an interface for connecting to the scanner engine 213. The bus line 210 is an address bus or a data bus for electrically connecting the above-described components as illustrated in FIG. 3.

The plotter engine 211 controls operation of a plotter of the image forming apparatus 14 in a process of printing an image on a recording medium. The plotter is an arbitrary printing device; for example, the plotter is an inkjet head in the case of an inkjet system and a photoconductor, a laser irradiation device, or a transfer device in the case of a laser printer system. The operation panel 212 is a panel for receiving input of setting, conditions, instructions, and the like from a user, and is, for example, a liquid crystal display deice or an organic EL display device with a touch panel function, or a keyboard and a mouse. The scanner engine 213 controls operation of a scanner of the image forming apparatus 14. The scanner is not specifically limited, and, for example, a well-known device including a pressure plate, an auto document feeder (ADF), and an imaging element may be used.

Description of Functional Configuration of Image Forming Apparatus

Figure 4:
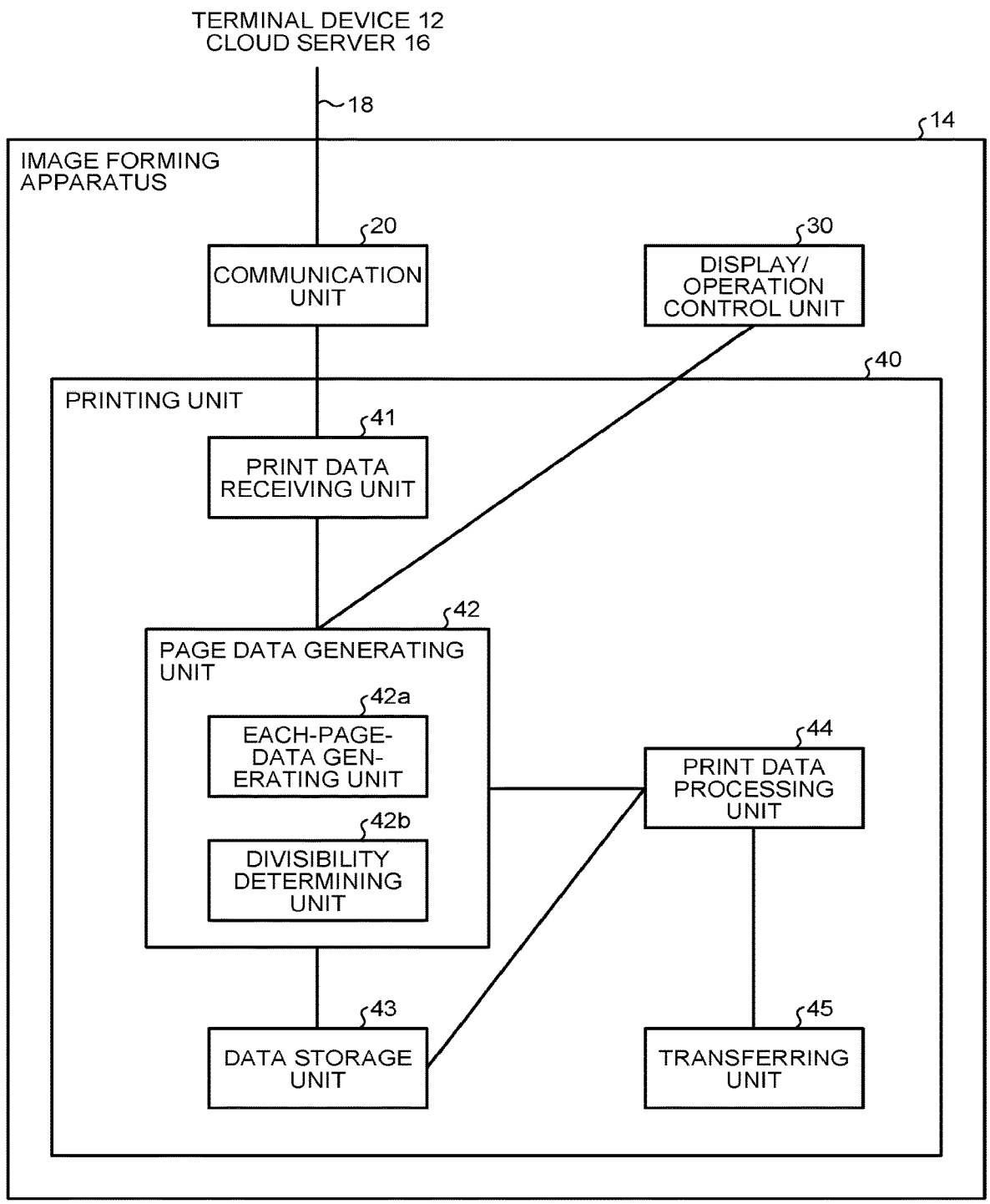
FIG. 4 is a functional block diagram illustrating an example of a functional configuration of the image forming apparatus.

A functional configuration of the image forming apparatus 14 will be described below. FIG. 4 is a functional block diagram illustrating an example of the functional configuration of the image forming apparatus 14.

The image forming apparatus 14 includes a communication unit 20, a display/operation control unit 30, and a printing unit 40. All of the components are functions that are implemented by causing any of the hardware components illustrated in FIG. 3 to operate in response to a command from the CPU 201 in accordance with various programs or applications that are for the image forming apparatus 14 and that are loaded from the ROM 202 to the RAM 203.

The communication unit 20 controls communication with other devices via the communication network 18 (see FIG. 1) in response to a command from the CPU 201 and a process performed by the network I/F 206. Further, the communication unit 20 functions as a receiving unit that receives a document file, such as a PDF file, from the terminal device 12 or the cloud server 16.

The display/operation control unit 30 receives an instruction from a user and issues a notice, such as a message. Further, the display/operation control unit 30 controls displaying of an image on a display of the operation panel 212 in response to a command from the CPU 201.

The printing unit 40 performs a printing process based on print data and a print instruction received by the communication unit 20, on the basis of a command from the CPU 201. The print data is a file that contains pieces of data of a plurality of pages and positional information indicating a position of the piece of data of each of the pages. Further, the printing unit 40 includes a print data receiving unit 41, a page data generating unit 42, a data storage unit 43, a print data processing unit 44, and a transferring unit 45.

The print data receiving unit 41 receives print data that is sent to the printing unit 40 from among pieces of print data received by the communication unit 20. Further, the print data receiving unit 41 instructs the page data generating unit 42 to perform printing.

The page data generating unit 42 divides or generates print data in response to a command from the CPU 201. Further, the page data generating unit 42 gives an instruction to store data in the data storage unit 43.

Further, the page data generating unit 42 includes an each-page-data generating unit 42a and a divisibility determining unit 42b. The each-page-data generating unit 42a divides print data into PDF files of respective pages on the basis of a determination result obtained by the divisibility determining unit 42b to be described later. Further, the each-page-data generating unit 42a generates print data of each of the pages by calculating missing information and adding the calculated missing information. Furthermore, the each-page-data generating unit 42a extracts a common object that is commonly referred to by a plurality of pages, and stores and loads the object in a storage (the RAM 203 or the HDD 205).

The divisibility determining unit 42b determines whether a PDF file is divisible on the basis of identification information in the print data or an instruction given by the display/operation control unit 30. Further, the divisibility determining unit 42b notifies the each-page-data generating unit 42a of a divisibility determination result.

The data storage unit 43 stores therein print data and page divided data that is generated by the page data generating unit 42. The data storage unit 43 is constructed by the ROM 202, the RAM 203, the NVRAM 204, or the HDD 205 described above with reference to FIG. 3.

The print data processing unit 44 reconstructs data by arranging objects by interpreting and drawing commands of print data, and generates a printing image.

The transferring unit 45 controls printing of the printing image generated by the print data processing unit 44 in accordance with operation of the plotter engine 211 based on a command from the CPU 201. The transferring unit 45 is one example of a printing unit.

Description of Functional Configuration of Terminal Device and Cloud Server

Figure 5:
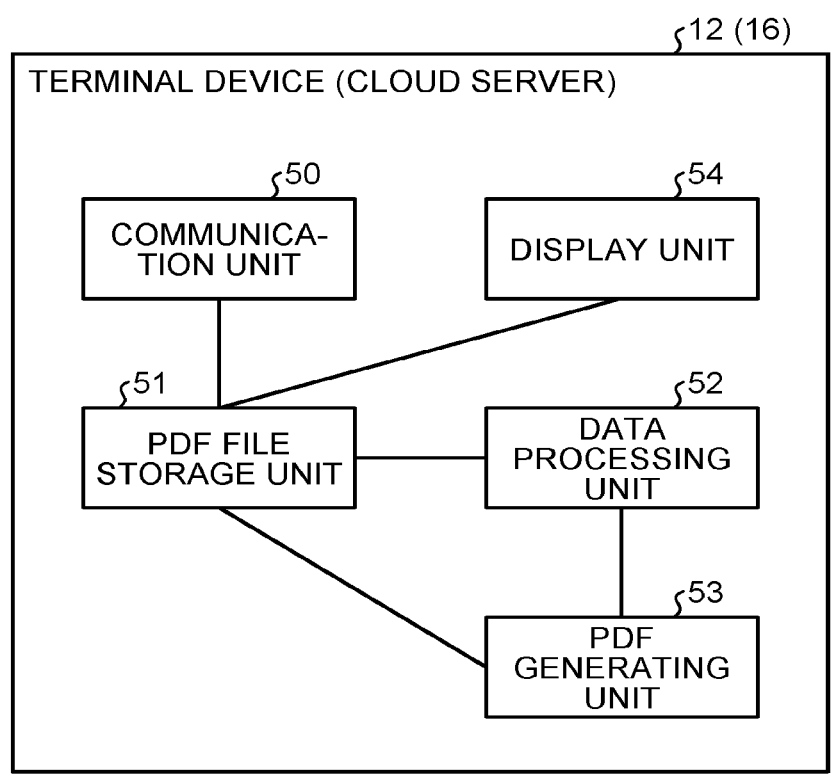
FIG. 5 is a functional block diagram illustrating an example of a functional configuration of the terminal device and a cloud server.

A functional configuration of the terminal device 12 and the cloud server 16, i.e., the information processing apparatus, will be described below. FIG. 5 is a functional block diagram illustrating an example of a functional configuration of the terminal device 12 and the cloud server 16. The terminal device 12 and the cloud server 16 have the same functional configuration.

Specifically, the terminal device 12 (the cloud server 16) includes a communication unit 50, a PDF file storage unit 51, a data processing unit 52, a PDF generating unit 53, and a display unit 54.

The communication unit 50 transmits print data via the communication network 18 (see FIG. 1) in response to a command from the CPU 101 and a process performed by the network I/F 107. The communication unit 50 is one example of a transmitting unit.

The PDF file storage unit 51 stores a PDF file that is a print target in the recording medium 106 or the like on the basis of a command from the CPU 101.

The data processing unit 52 determines whether to divide the PDF file stored in the PDF file storage unit 51 into pages on the basis of a command from the CPU 101. The data processing unit 52 is one example of an extracting unit, a determining unit, and a setting unit.

The PDF generating unit 53 divides the PDF file on the basis of a command from the CPU 101. Further, the PDF generating unit 53 determines a method of determining and defining a common object. The PDF generating unit 53 is one example of a reconstructing unit.

The display unit 54 receives an instruction from a user and issues a notice, such as a message.

That is, the terminal device 12 and the cloud server 16 have the functions that are included in the image forming apparatus 14, except for the function of the printing unit that actually performs printing among.

Description of Flow of Printing Process

Figure 6:
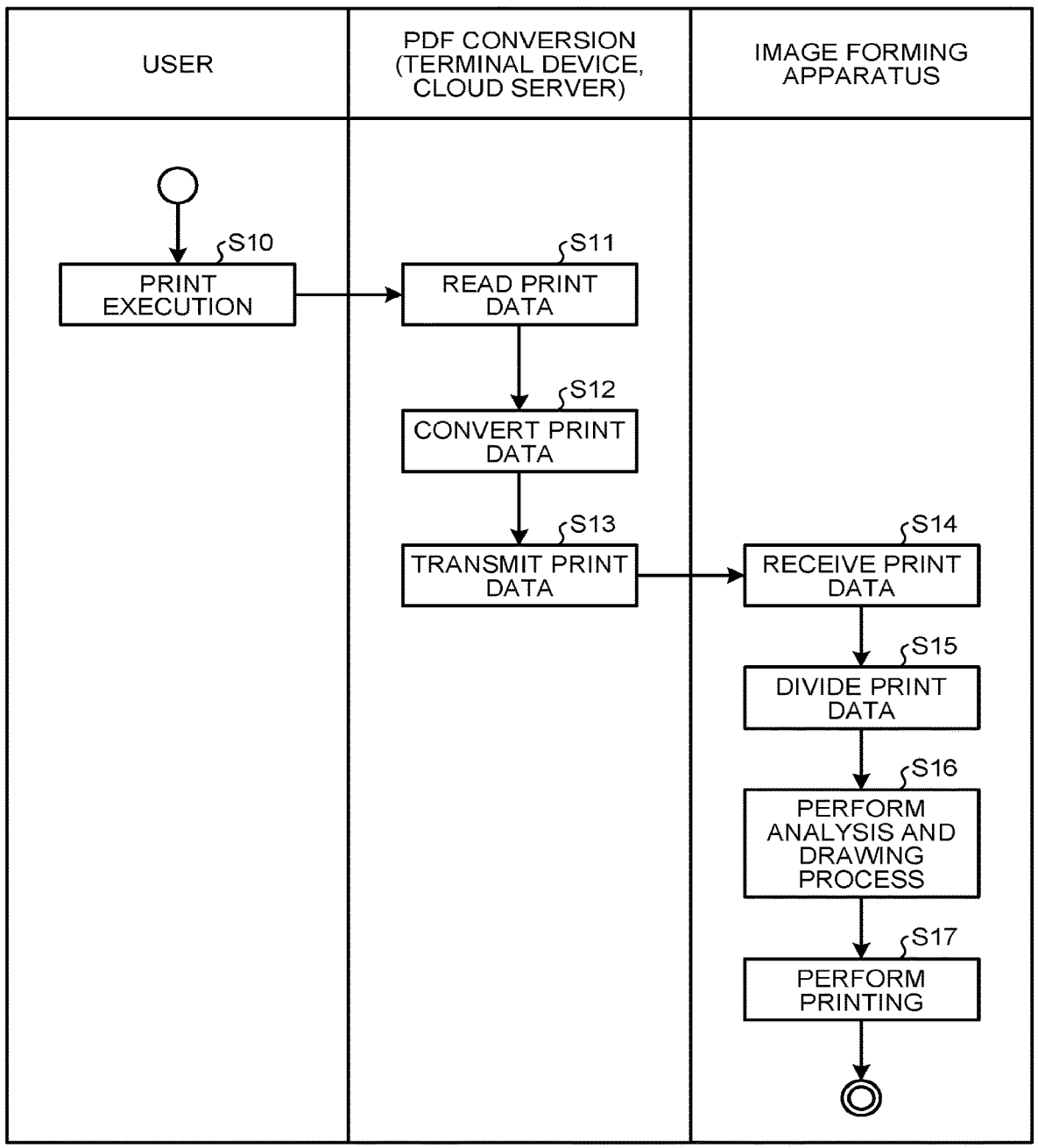
FIG. 6 is a diagram illustrating the flow of a printing process performed by the image forming system.

The flow of a printing process performed by the image forming system 10 will be described below with reference to FIG. 6. FIG. 6 is a diagram illustrating the flow of a printing process performed by the image forming system 10.

A user gives an instruction on print execution via an operating unit on the terminal device 12 or the cloud server 16 (Step S10).

Upon receiving the instruction from the user, the terminal device 12 or the cloud server 16 reads print data (Step S11). Then, the terminal device 12 or the cloud server 16 converts the print data into a format in which information recorded in a PDF file is arranged by page (Step S12). Then, the communication unit 50 of the terminal device 12 or the cloud server 16 transmits the converted print data to the image forming apparatus 14 (Step S13).

The communication unit 20 of the image forming apparatus 14 receives the print data (Step S14), and generates PDF files by dividing the received print data into pages (Step S15). Further, the image forming apparatus 14 performs a language analysis and a drawing process on the PDF file of each of the pages (Step S16). Then, the print data is printed (a paper is ejected) (Step S17).

Description of Structure of PDF File

Figure 7:
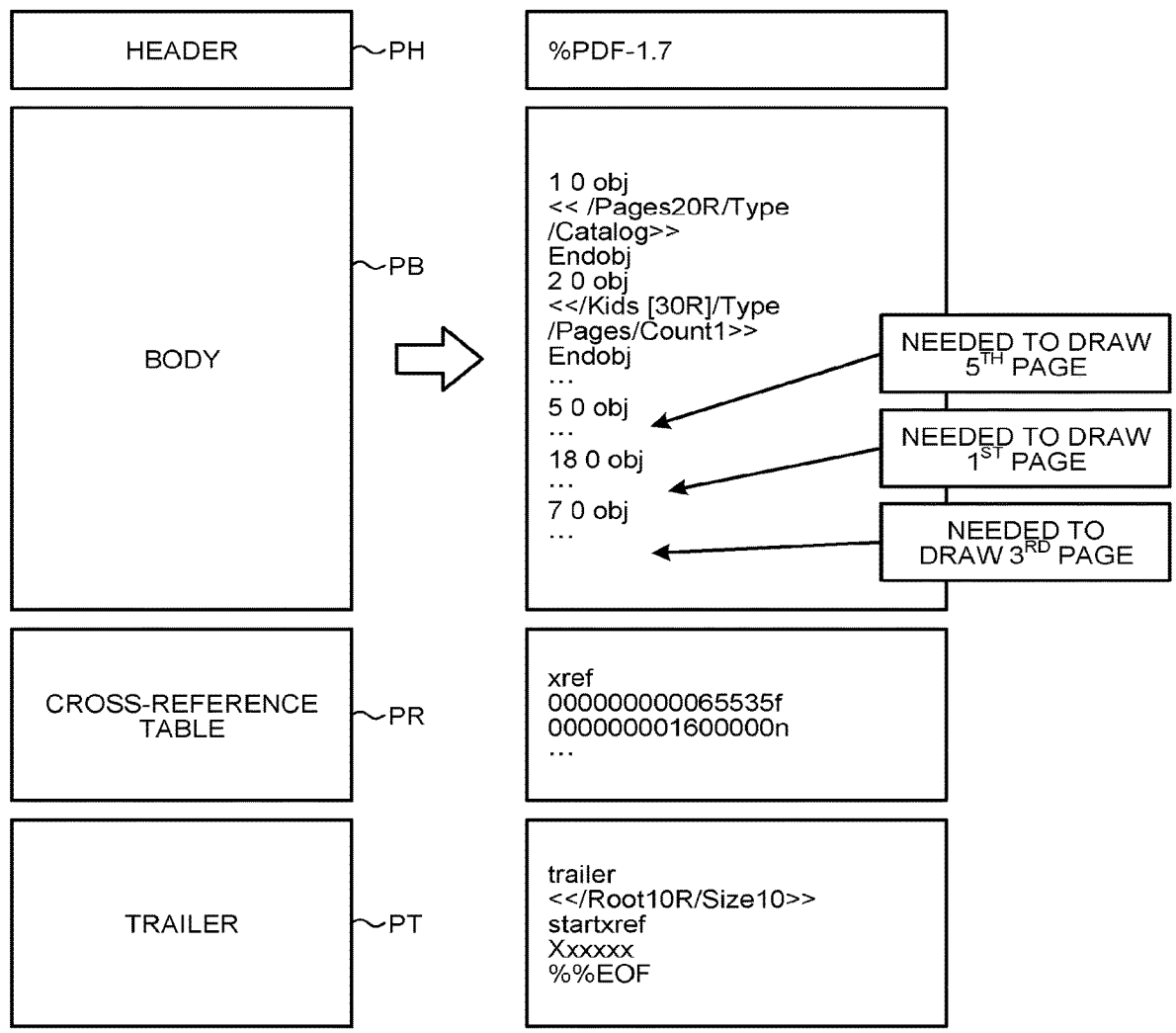
FIG. 7 is a diagram for explaining an example of a data structure of a PDF file.

A structure of the PDF file will be described below with reference to FIG. 7. FIG. 7 is a diagram for explaining an example of a data structure of the PDF file. The PDF file includes, from the top, a header PH, a body PB, a cross-reference table PR, and a trailer PT, in compliance with the open standard managed by the International Organization for Standardization (ISO).

The header PH contains version information on a PDF or the like.

The body PB defines a document catalog, page information, object information on each page, and the like for each object number. The object number is an identifier of an object, and is configured as a sequence of a reference number (x), a generation number (y), and "obj", e.g., "x y obj", for example. The document catalog is a root (highest order) of an object hierarchy. The page information contains reference to the object information on each page, or the like. The object information on each page contains data for drawing each page.

Due to the language specification of the PDF, the object information need not be arranged by page and the object numbers need not be arranged in a sequential order. Therefore, as illustrated in FIG. 7, objects needed for each page are arranged randomly. Consequently, it is difficult to determine how many objects need to be received for an n-th page unless the objects are aligned.

The cross-reference table PR contains address information (positional information) on the object with each of the object numbers defined in the body PB. The address information is offset information indicating the order of bytes of the object from the top of the header. The image forming apparatus 14 is able to specify positions of objects and directly access an arbitrary object on the basis of the cross-reference table PR.

The trailer PT contains address information (startxref) indicating a position of the cross-reference table PR, an object number (Root) of a document catalog, and information (Info) on a date and time at which the PDF file is generated.

Due to the structure of the PDF file, the image forming apparatus 14 accesses the document catalog by identifying the object number of the document catalog from the trailer PT and identifying the address information corresponding to the object number from the cross-reference table PR. In other words, the image forming apparatus 14 performs image processing on the PDF file after reading the entire PDF file.

Description of Sequence for Rearranging a PDF by Page

Figure 8:
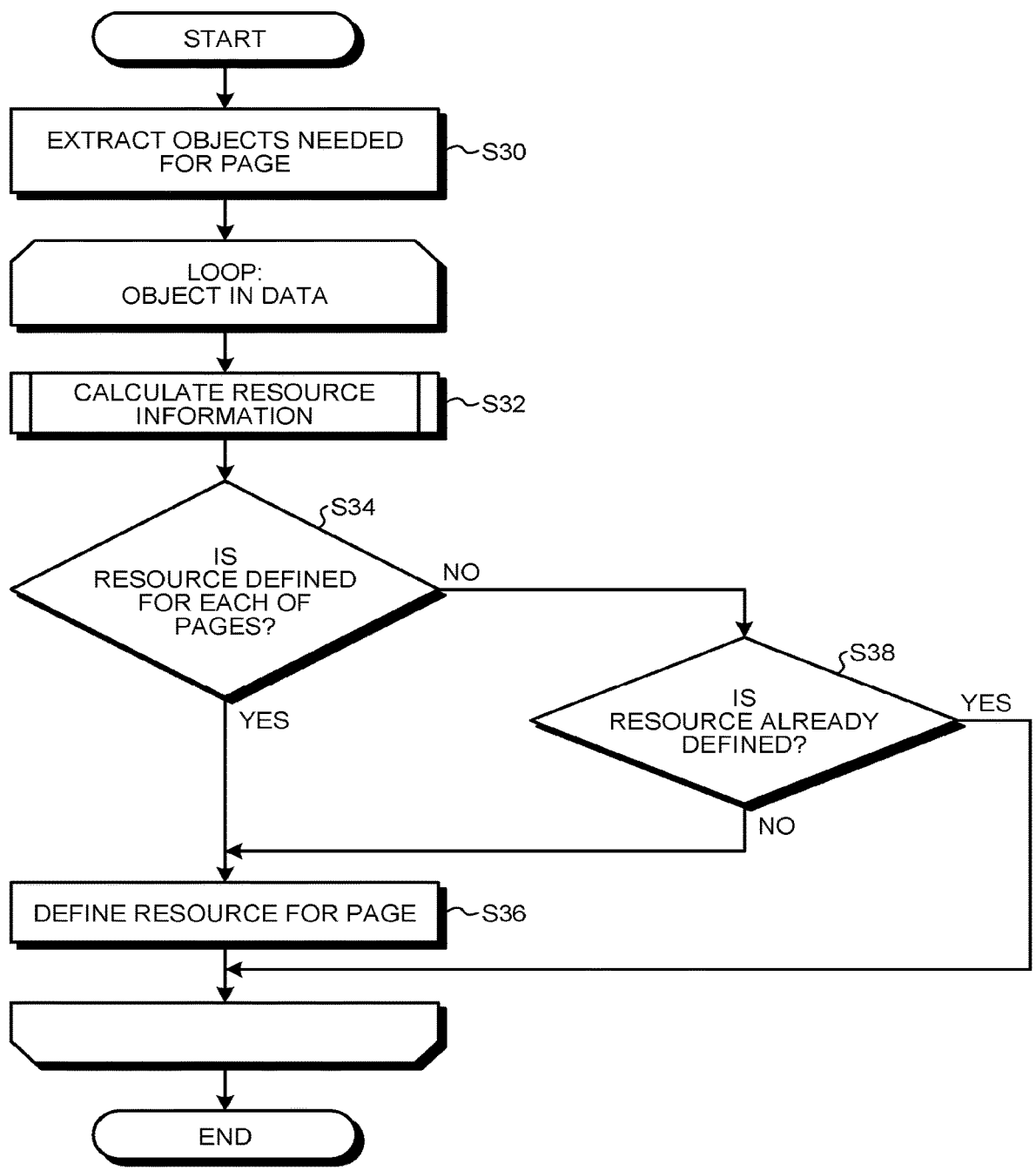
FIG. 8 is a flowchart illustrating an example of the flow of a process of rearranging a PDF file by page.
Figure 9:
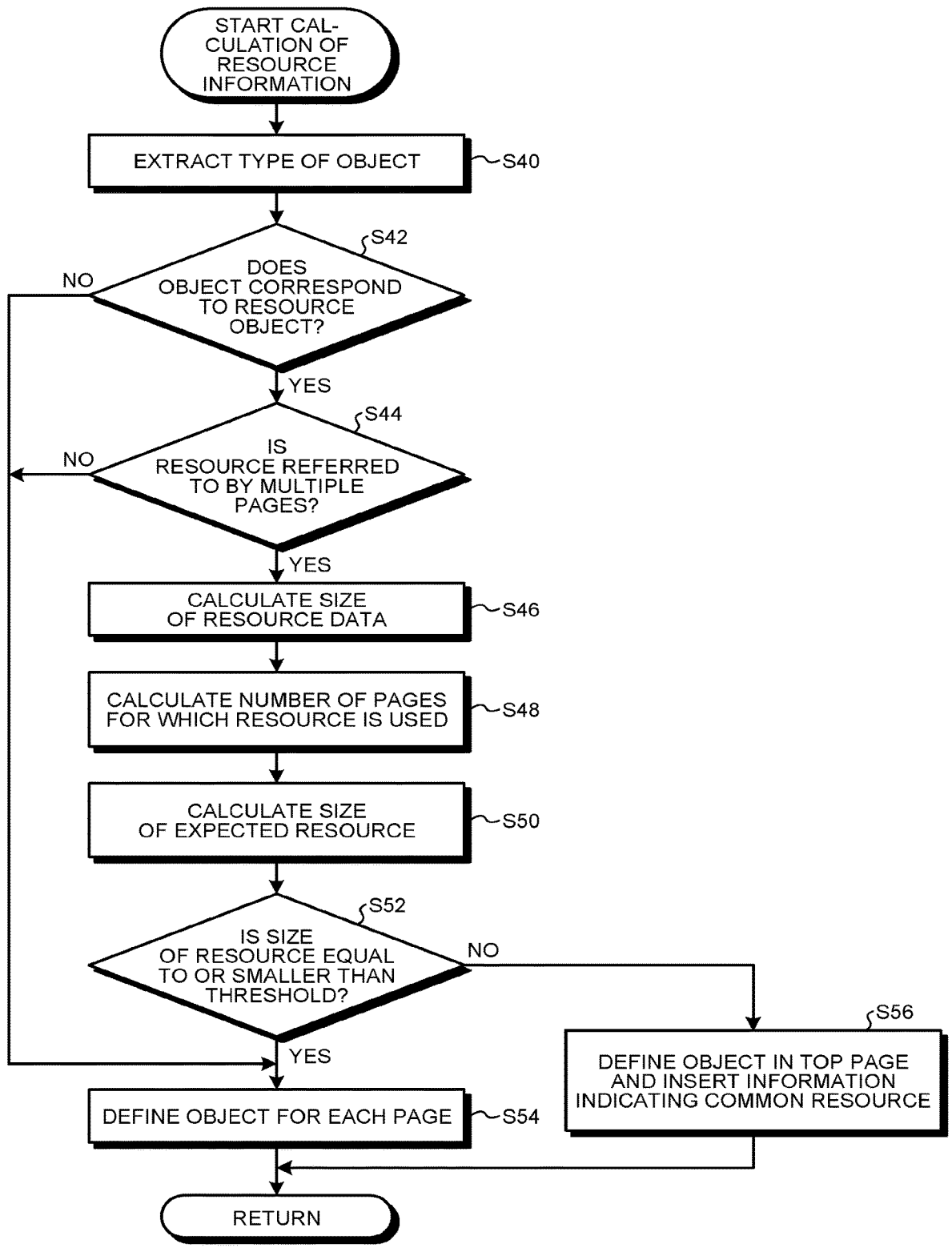
FIG. 9 is a flowchart illustrating an example of the detailed flow of calculation of resource information in FIG. 8.

A sequence for rearranging the PDF file by page will be described below with reference to FIG. 8 and FIG. 9. FIG. 8 is a flowchart illustrating an example of the flow of a process of rearranging the PDF file by page. FIG. 9 is a flowchart illustrating an example of the detailed flow of calculation of resource information in FIG. 8.

When being instructed to print a PDF file, the terminal device 12 or the cloud server 16 performs a process as described below to generate a PDF file that is rearranged by page.

First, the data processing unit 52 extracts objects that are needed for a print target page (Step S30).

Subsequently, the data processing unit 52 and the PDF generating unit 53 perform processes as described below on all of the extracted objects.

The data processing unit 52 calculates resource information (Step S32). The detailed flow of the process of calculating the resource information will be described later (see FIG. 9).

Subsequently, the PDF generating unit 53 determines whether to define a resource for each of the pages (Step S34). If it is determined that a resource is defined for each of the pages (YES at Step S34), the process proceeds to Step S36. In contrast, if it is not determined that a resource is defined for each of the pages (NO at Step S34), the process proceeds to Step S38.

If it is determined as "Yes" at Step S34, the each-page-data generating unit 42a defines a resource for a page at Step S36. Thereafter, the process returns to Step S32 and the process is performed on the next object.

If it is determined as "No" at Step S34, the PDF generating unit 53 determines whether a resource is already defined at Step S38. If it is determined that a resource is already defined (YES at Step S38), a resource is not defined for the subject page (in other words, resources are not redundantly defined). Then, the process returns to Step S32 and the process is performed on the next object. In contrast, if it is not determined that a resource is already defined (NO at Step S38), the process returns to Step S36 as described above.

The detailed flow of the process of calculating the resource information will be described below with reference to FIG. 9. The process of calculating the resource information is performed by the data processing unit 52.

First, a type of an object is extracted with respect to the object extracted from the page (Step S40).

Subsequently, it is determined whether the extracted object corresponds to a resource object (Step S42). The resource object is a definition of a unique object that does not influence the page information, and indicates a font, a color space, an image object, or the like. For example, the resource object is an object, such as a background, a logo mark, or a watermark of presentation software, which is commonly drawn in all of pages, or data, such as font data or international color consortium (ICC) profile, which is commonly used in all of pages.

At Step S42, if it is determined that the object corresponds to the resource object (YES at Step S42), the process proceeds to Step S44. In contrast, if it is not determined that the object corresponds to the resource object (NO at Step S42), it is determined that the object is information unique to the page, and the process proceeds to Step S54 at which the object is defined for each of the pages.

If it is determined as "Yes" at Step S42, it is determined whether the resource is referred to by a plurality of pages at Step S44. If it is determined that the resource is referred to by a plurality of pages (YES at Step S44), the process proceeds to Step S46. In contrast, if it is not determined that the resource is referred to by a plurality of pages (NO at Step S44), the process proceeds to Step S54 at which the object is defined for each of the pages.

If it is determined as "Yes" at Step S44, a size of resource data is calculated at Step S46. Subsequently, at Step S48, the number of pages for which the resource is used is calculated.

Then, a size of an expected resource is calculated (Step S50). Specifically, the size of the resource is calculated by multiplying the size of the resource data by the number of pages.

Subsequently, it is determined whether the size of the resource is equal to or smaller than a threshold (Step S52). If it is determined that the size of the resource is equal to or smaller than the threshold (YES at Step S52), the process proceeds to Step S54. In contrast, if it is not determined that the size of the resource is equal to or smaller than the threshold (NO at Step S52), the process proceeds to Step S56.

If it is determined as "Yes" at Step S52, the object is defined for each of the pages at Step S54. After execution of Step S54, the process returns to Step S34 in the flowchart of FIG. 8.

If it is determined as "No" at Step S52, the object is defined in the top page, i.e., at a position at which the object is to be first referred to at Step S56. At this time, information indicating that the object is a common resource is added. With this operation, it is possible to hold the resource without discarding the resource until printing of a page that refers to the resource is completed by the image forming apparatus 14. After execution of Step S56, the process returns to Step S34 in the flowchart of FIG. 8.

By changing an object defining method as described above, although a data size increases if a resource is defined for each of the pages, the increase in the size is accepted when the size is equal to or smaller than a threshold, and, an object is defined in only the top page when the size is larger than the threshold.

Meanwhile, it may be possible to adopt a system of referring to all of the objects in advance, extracting a "common resource" that is to be defined in the top page, and adding the common resource to the top of a job.

Description of Example of Rearrangement of Objects

Figure 10:
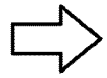
FIG. 10 is a diagram for explaining an example of rearrangement of objects when it is determined that an object is defined in the top page.
Figure 11:
FIG. 11 is a diagram for explaining an example of rearrangement of objects when it is determined that an object is defined in each of pages.

A specific example of rearrangement of objects will be described below with reference to FIG. 10 and FIG. 11. FIG. 10 is a diagram for explaining an example of rearrangement of objects when it is determined that an object is defined in the top page. FIG. 11 is a diagram for explaining an example of rearrangement of objects when it is determined that an object is defined in each of pages.

When it is determined that an object is defined in the top page, as illustrated in FIG. 10, "31 0 obj" that is commonly used for all of the pages is defined in only the top page that is to be referred to (a row f1 in FIG. 10). Therefore, the data size of the PDF file is determined as illustrated in FIG. 10.

Meanwhile, the object that is commonly used for all of the pages is assigned with a specific number (for example, in the 10,000s) as the object number such that the object can be identified by the terminal device 12 or the cloud server 16, for example. Further, information indicating that the object is to be stored is added before or after the resource object to be stored. Furthermore, information on the page number where the object is to be referred to is added.

Moreover, when it is determined that an object is defined in each of the pages, as illustrated in FIG. 11, "31 0 obj" that is commonly used for all of the pages is defined as "31 0 obj" (a row f2 in FIG. 11), "32 0 obj" (a row f3 in FIG. 11), and "33 0 obj" (a row f4 in FIG. 11) for the respective pages that are to be referred to.

Therefore, the data size of the PDF file is determined as illustrated in FIG. 11. In this manner, by defining the object in each of the pages, the data size increases as compared to the data size illustrated in FIG. 10.

Meanwhile, the object defining method may be appropriately changed depending on a status of the image forming apparatus 14 that serves as a transmission destination of a PDF file. In other words, for example, when the image forming apparatus 14 does not include the HDD 205, it is desirable to use the method as illustrated in FIG. 10, i.e., the method of defining the object in the top page. Furthermore, when the traffic of the communication network 18 is large, it is desirable to use the method as illustrated in FIG. 11, i.e., the method of defining the object in each of the pages.

Description of Method of Setting Threshold for Data Size

Figure 12:
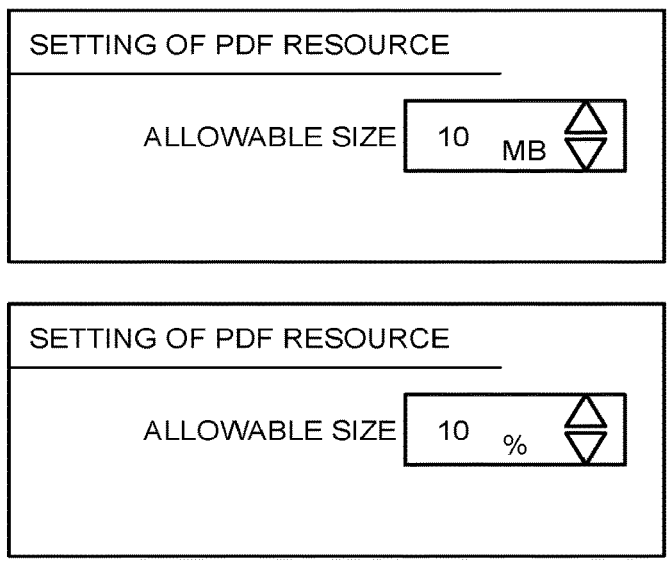
FIG. 12 is a diagram for explaining an example for defining a threshold for an allowable data size that is used when an object is arranged in each of the pages, in accordance with operation on an operation panel.
Figure 13:
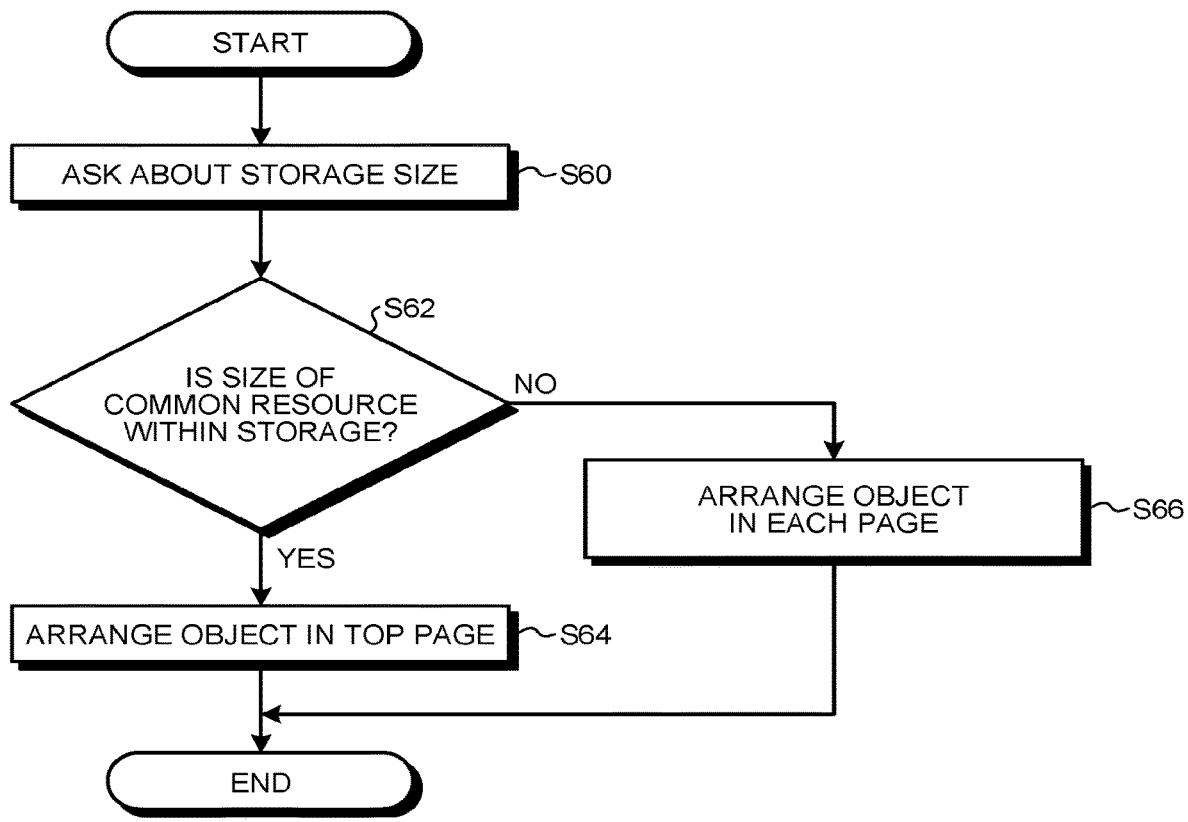
FIG. 13 is a diagram for explaining an example for automatically changing an object defining method depending on a storage size that is available to the image forming apparatus.

A method of setting a threshold for a data size will be described below with reference to FIG. 12 and FIG. 13. FIG. 12 is a diagram for explaining an example for defining a threshold for a data size to be accepted when an object is arranged in each of the pages, in accordance with operation on the operation panel 212 (see FIG. 3). FIG. 13 is a diagram for explaining an example for automatically changing the object defining method depending on a storage size that is available to the image forming apparatus 14, i.e., depending on the volume or the like of the RAM 203 or the HDD 205.

As a parameter used to determine whether to define the common object in the top page (to be referred to by a plurality of pages) or in each of the pages, a data size (a size of a PDF file) is used. An example for setting a threshold for the degree of acceptance of an increase in the data size before and after rearrangement of PDF data will be described with reference to FIG. 12.

As illustrated in FIG. 12, by allowing a user to operate the operation panel 212 on the printer 14a or the MFP 14b, it is possible to set the threshold for the data size that is to be accepted when the object is arranged in each of the pages. As illustrated in FIG. 12, the threshold for the data size may be set by actual data size (for example, 10 MB or the like) or a percentage of the whole data (for example, 10% or the like). It is possible to set a larger number of common objects that are to be rearranged and referred to by a plurality of pages with an increase in the threshold, and the number of objects that can be set is reduced with a decrease in the threshold. This is because, as will be described later with reference to FIG. 15, it is necessary to hold the common objects that are to be referred to by a plurality of pages until completion of processes on the pages that refer to the objects, and this depends on the capability, such as a paper ejection performance, of the image forming apparatus 14.

Meanwhile, it may be possible to set an upper limit of the size of the "common object" itself and determine whether to define the object as the common object to be referred to by a plurality of pages or to define the object in each of the pages, on the basis of whether the size falls below the upper limit or exceeds the upper limit.

Next, a method of automatically changing the object defining method depending on the storage size that is available to the image forming apparatus 14 will be described with reference to FIG. 13.

The divisibility determining unit 42b (see FIG. 4) asks the image forming apparatus 14 about the storage size at the time of rearranging the PDF file (Step S60).

Subsequently, the divisibility determining unit 42b determines whether the size of the common resource falls within the storage (Step S62). If it is determined that the size of the common resource falls within the storage (YES at Step S62), the process proceeds to Step S64. In contrast, if it is not determined that the size of the common resource falls within the storage (NO at Step S62), the process proceeds to Step S66.

If it is determined as "Yes" at Step S62, the each-page-data generating unit 42a arranges the object in the top page at Step S64.

In contrast, if it is determined as "No" at Step S62, the each-page-data generating unit 42a arranges the object in each of the pages at Step S66.

Meanwhile, even when the sum of the sizes of the common objects does not fall within the storage size of the image forming apparatus 14, it may be possible to define a certain number of objects corresponding to the storage size such that the objects are referred to by a plurality of pages, and define the remaining objects for each of the pages.

Description of Flow of Process of Printing PDF File

Figure 14:
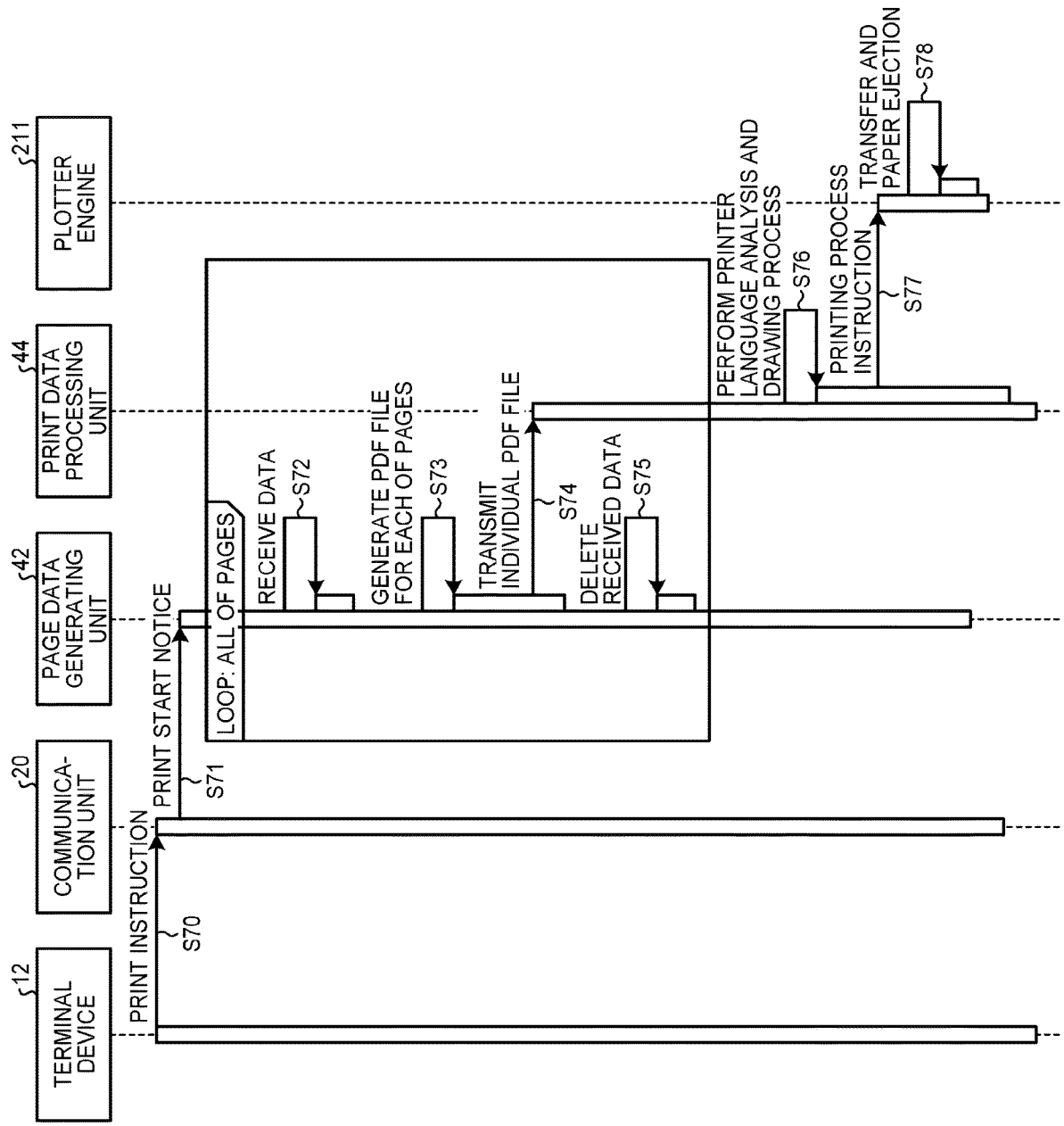
FIG. 14 is a sequence diagram illustrating an example of the flow of a process of printing a PDF file.

The flow of a process of printing a PDF file will be described below with reference to FIG. 14. FIG. 14 is a sequence diagram illustrating an example of the flow of a process of printing a PDF file.

A PDF file containing a plurality of pages generated by the terminal device 12 is stored in the SSD 104 of the terminal device 12. The terminal device 12 transmits a print instruction to the image forming apparatus 14 via the communication network 18 in accordance with an operation input given by a user (Step S70).

A transmission source of a print request is not limited to the terminal device 12. The transmission source of the print request may be the cloud server 16. Further, the MFP 14b may generate a PDF file based on an image that is read by the scanner, include the PDF file in a print request to be transmitted to the printer 14a, and transmits the print request. A printing method is not specifically limited. For example, it may be possible to adopt mobile printing, such as AirPrint (registered trademark) or Mopria (registered trademark), or direct printing for directly transmitting a PDF file to the image forming apparatus 14 by using a protocol, such as ftp or 1pr. Further, it may be possible to adopt cloud printing, such as GoogleCloudPrint (registered trademark). Furthermore, the printing method may be media printing. In this case, the process at Step S70 is replaced with a process of transmitting a PDF file to the image forming apparatus 14 from a recording medium, such as a universal serial bus (USB) memory (not illustrated in FIG. 3), that is connected to the image forming apparatus 14.

The communication unit 20 of the image forming apparatus 14 receives a print request transmitted from the terminal device 12. Upon starting to receive the PDF file contained in the print request, the communication unit 20 sequentially stores the received PDF file (performs buffering) in the RAM 203 serving as a buffer. Then, the image forming apparatus 14 continues a printing process as described below without waiting for completion of the buffering.

The communication unit 20 transmits a print start notice for starting printing to the page data generating unit 42 (Step S71).

Upon receiving the print start notice, the page data generating unit 42 receives the PDF data via a receiving buffer (Step S72).

The page data generating unit 42 (the divisibility determining unit 42b) determines whether the received PDF data can be divided into page data. If it is determined that the PDF data is divisible, the page data generating unit 42 (the each-page-data generating unit 42a) generates a PDF file for each of the pages, to which the header PH and the trailer PT are added (Step S73).

Furthermore, the page data generating unit 42 transmits an individual PDF file that is the PDF file for each of the pages to the print data processing unit 44 (Step S74).

Thereafter, the page data generating unit 42 deletes the received data that is a source of the individual PDF file that is transmitted to the print data processing unit (Step S75). In other words, a size of the receiving buffer that is temporarily needed corresponds to a size of the received data of one page, so that it is possible to reduce a size of a storage area that is needed at the time of printing.

Subsequently, the print data processing unit 44 performs a printer language analysis on the received individual PDF file, and generates a print image by performing a drawing process of drawing an image on a frame memory (Step S76).

Further, the print data processing unit 44 instructs the plotter engine 211 to perform a printing process (Step S77).

Upon receiving the instruction from the print data processing unit 44, the plotter engine 211 transfers the print image to a paper and ejects the paper (Step S78).

Meanwhile, the page data generating unit 42 generates, from the received PDF data, the individual PDF files in order of pages to be printed and gives a notice to the print data processing unit 44, and therefore, repeats the processes from Step S72 to Step S75 the same number of times as the number of pages to be printed.

Description of Process of Generating PDF File for Each Page

Figure 15:
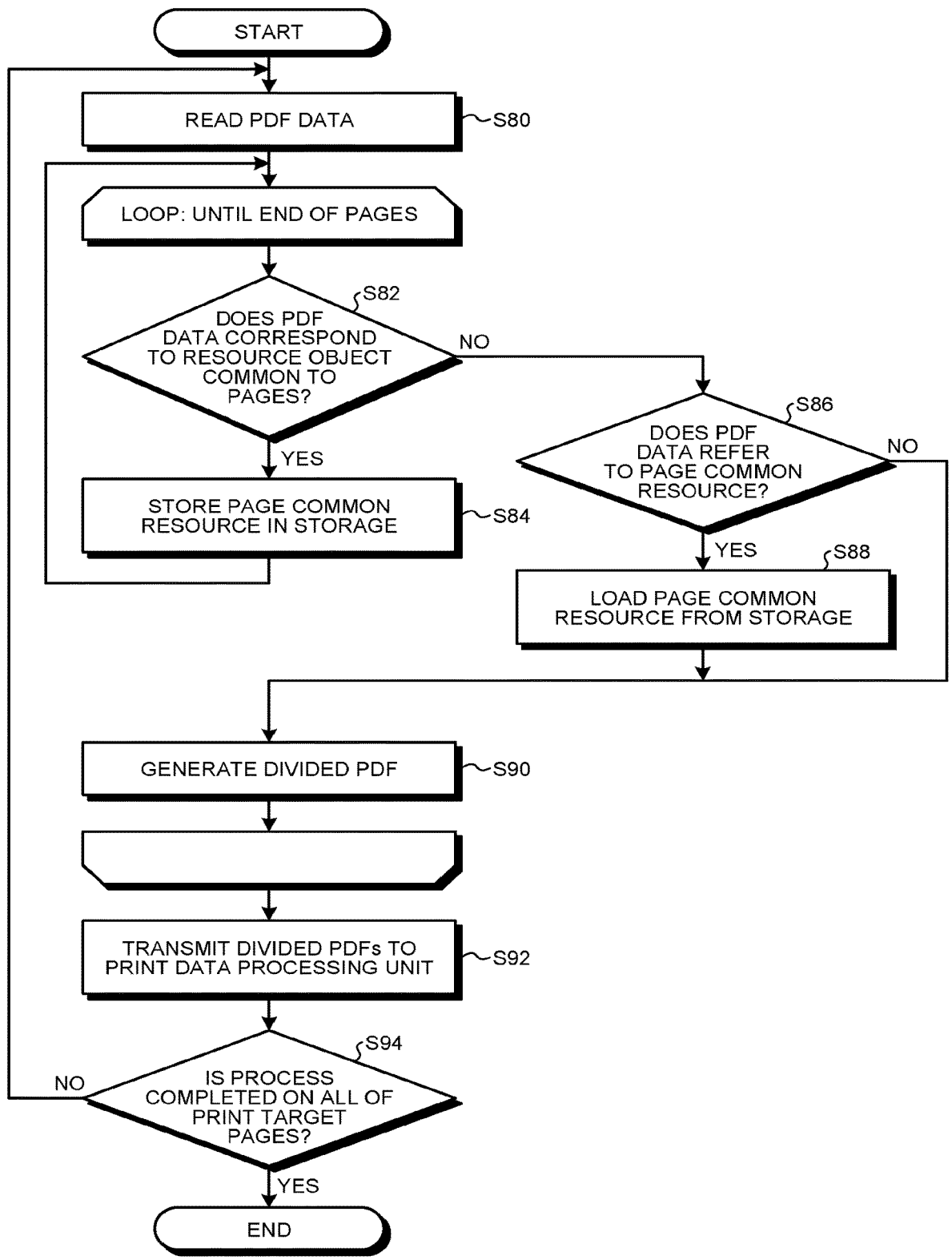
FIG. 15 is a flowchart illustrating an example of the flow of a process of generating a PDF for each of pages.

The flow of a process of generating a PDF file for each of the pages by the image forming apparatus 14 will be described below with reference to FIG. 15. FIG. 15 is a flowchart illustrating the flow of the process of generating a PDF for each of the pages.

Upon receiving the PDF data, the print data receiving unit 41 starts to read the received PDF data (Step S80).

Subsequently, the divisibility determining unit 42b determines whether the read PDF data corresponds to a resource object that is commonly used in the pages (Step S82). At Step S82, if it is determined that the PDF data corresponds to the resource object that is common to the pages (YES at Step S82), the process proceeds to Step S84. In contrast, if it is not determined that the PDF data does not correspond to the resource object that is common to the pages (NO at Step S82), the process proceeds to Step S86. Meanwhile, whether the read PDF data corresponds to the resource object that is common to the pages is determined by determining whether the PDF data has a specific number indicating the resource object that is common to the pages as described above (see FIG. 10).

If it is determined as "Yes" at Step S82, the page common resource is stored in a storage (the HDD 205 or the RAM 203) at Step S84 such that the resource can be referred to by subsequent pages. Thereafter, the process returns to Step S82, and the process is repeated for all of the pages of the PDF data.

If it is determined as "No" at Step S82, it is determined whether the PDF data refers to the page common resource at Step S86. If it is determined that the PDF data refers to the page common resource (YES at Step S86), the process proceeds to Step S88. In contrast, if it is not determined that the PDF data refers to the page common resource (NO at Step S86), the process proceeds to Step S90.

If it is determined as "Yes" at Step S86, the each-page-data generating unit 42a loads an already-stored page common resource from the storage at Step S88. Thereafter, the process proceeds to Step S90. The loaded page common resource is used as information for generating PDF data for each of the pages.

If it is determined as "No" at Step S86 or after Step S88, a divided PDF (PDF data of each of the pages) is generated by using the loaded data at Step S90. Thereafter, the process returns to Step S82, and the process is repeated for all of the pages of the PDF data.

Subsequently, the page data generating unit 42 transmits the divided PDFs to the print data processing unit 44 (Step S92).

The page data generating unit 42 determines whether the process is completed on all of print target pages (Step S94). If it is determined that the process is completed on all of the print target pages (YES at Step S94), the process in FIG. 15 is terminated. In contrast, if it is not determined that the process is completed on all of the print target pages (NO at Step S94), the process returns to Step S80, and the process is repeated until there exists no PDF data.

While FIG. 15 is a flowchart illustrating the flow of a PDF generation process performed by the image forming apparatus 14, the image forming system 10 may be configured to cause the terminal device 12 or the cloud server 16 to perform the same PDF generation process.

Description of Specific Example of Process of Generating PDF File for Each Page

Figure 16:
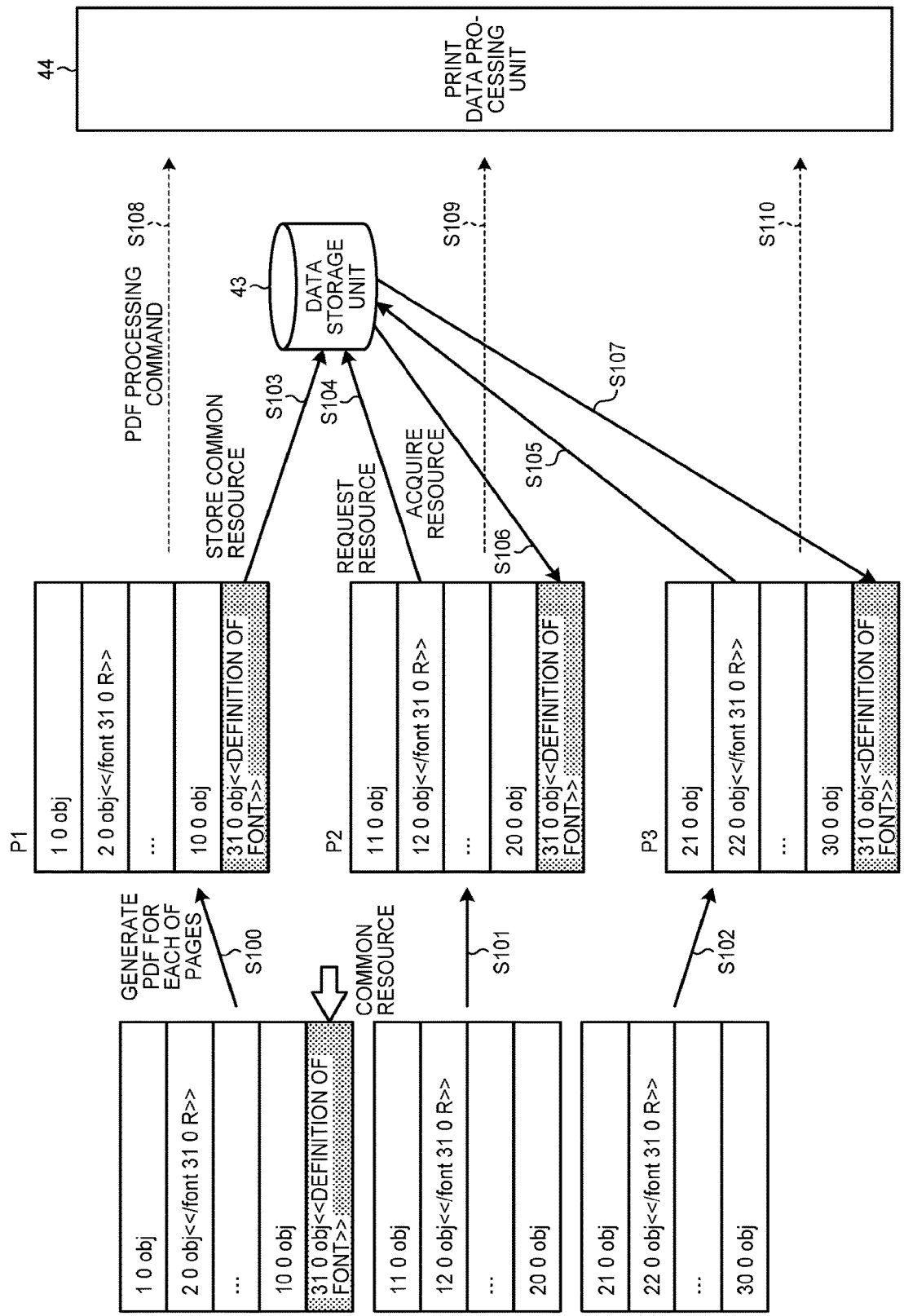
FIG. 16 is a diagram illustrating a specific example of the process of generating a PDF for each of pages.

A specific example of the process of generating a PDF file for each of the pages will be described below with reference to FIG. 16. FIG. 16 is a diagram illustrating a specific example of the process of generating a PDF file for each of the pages.

For example, when it is determined that an object is defined in the top page, PDF data as illustrated on the left side of FIG. 16 for example is input to the image forming apparatus 14.

At this time, the page data generating unit 42 generates PDF data for each of pages (P1, P2, and P3) as illustrated in the center of FIG. 16 (Steps S100, S101, and S102).

At this time, if the common resource that is commonly used for all of the pages is present, the page data generating unit 42 stores the common resource in the storage (the HDD 205 or the RAM 203) (Step S103). If a request is issued at a later time (Steps S104 and S105), the stored common resource is acquired (Steps S106 and S107), and data is added to each of the pages.

With this operation, it is possible to hold substance of the object inside the PDF data that is generated for each of the pages. Subsequently, the PDF data of each of the pages is transmitted, as a PDF processing command, to the print data processing unit 44 (Steps S108, S109, and S110). Then, the print data processing unit 44 reconstructs the data by arranging the objects, and generates a printing image that can be subjected to a drawing process.

In the example of the present embodiment, the image forming apparatus 14 is configured such that the CPU 201 implements various processes using software; however, a part or all of the processes may be implemented by hardware, such as an integrated circuit (IC). Furthermore, various programs may be provided by being recorded in a computer readable recording medium, such as a CD-ROM, a flexible disk (FD), a CD-R, a DVD, a Blu-ray disk (registered trademark), or a semiconductor memory, in a computer-installable or computer-executable file format. The DVD is an abbreviation of a "digital versatile disc". Moreover, various programs may be provided by being installed via a network, such as the Internet. Furthermore, various programs may be provided by being incorporated in a ROM or the like in an apparatus in advance.

Description of Modification of Embodiment

A modification of the embodiment as described above will be described below. In the embodiment as described above, the image forming apparatus 14 receives PDF data via the communication unit 20 (see FIG. 4) and the communication network 18 (see FIG. 1). An image forming apparatus 14a (see FIG. 17) according to the modification is configured such that a storage media in which PDF data is stored is insertable, and printing is performed by reading a PDF file stored in a storage media that is inserted by a user.

Figure 17:
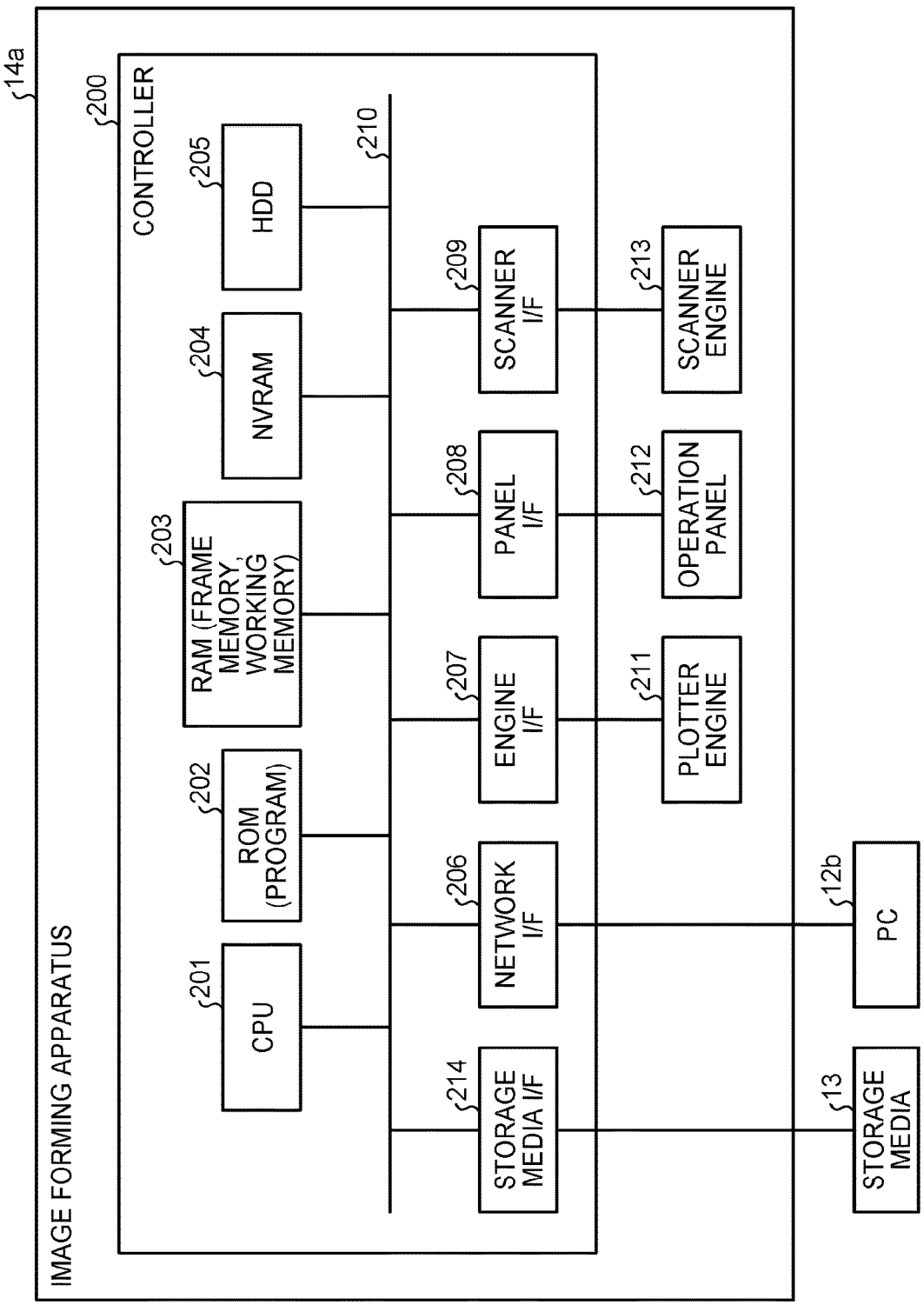
FIG. 17 is a hardware block diagram illustrating an example of a hardware configuration of a modification of the image forming apparatus.
Figure 18:
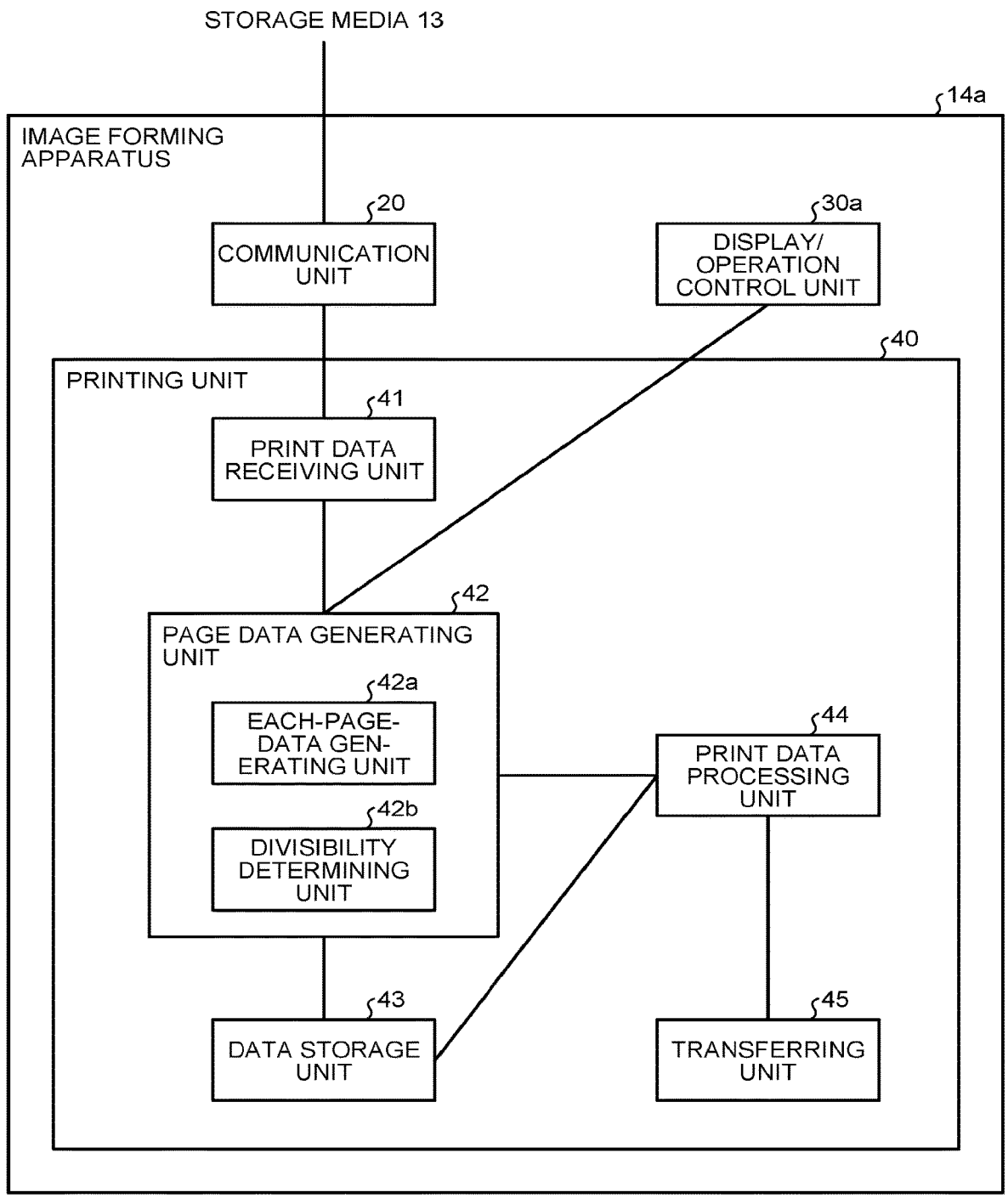
FIG. 18 is a functional block diagram illustrating an example of a functional configuration of the modification of the image forming apparatus.

A configuration and functions of the modification of the embodiment will be described below with reference to FIG. 17 and FIG. 18. FIG. 17 is a hardware block diagram illustrating an example of a hardware configuration of a modification of the image forming apparatus 14. FIG. 18 is a functional block diagram illustrating an example of a functional configuration of the modification of the image forming apparatus 14. The hardware configuration and the functional configuration of the image forming apparatus 14a that is the modification of the image forming apparatus 14 are approximately the same as those of the image forming apparatus 14 as described above, and therefore, the same components will be denoted by the same reference signs.

As illustrated in FIG. 17, the image forming apparatus 14a further includes a storage media I/F 214 in addition to the components of the image forming apparatus 14. The storage media I/F 214 is an interface for performing communication with a storage media 13 (for example, a USB memory or the like) that is inserted in the image forming apparatus 14a. The storage media 13 is one example of a recording medium.

As illustrated in FIG. 18, the image forming apparatus 14a has approximately the same functional configuration as the image forming apparatus 14. Specifically, the communication unit 20 has a function to control communication with the storage media 13, in addition to the function to control communication with other devices (the terminal device 12 and the cloud server 16) via the communication network 18 (see FIG. 1) as described above.

Further, a display/operation control unit 30a includes the extracting unit, the determining unit, and the reconstructing unit that are included in the terminal device 12 and the cloud server 16 as described above, in addition to the functions of the display/operation control unit 30 as described above.

A user inserts the storage media 13, in which PDF data to be printed by the image forming apparatus 14a is stored, in a slot or the like that is arranged in the image forming apparatus 14. Then, the user specifies the PDF data to be printed through operation of the display/operation control unit 30 by operating the operation panel 212. The communication unit 20 reads the specified PDF data from the storage media 13. Then, the image forming apparatus 14a performs the same processes as those described in the embodiment, to thereby divide and generate the specified PDF data and perform printing.

Meanwhile, by providing the communication unit 20 with both of the function to control communication with the other devices via the communication network 18 and the function to control communication with the storage media 13, it is possible to read the PDF data from any of the terminal device 12, the cloud server 16, and the storage media 13 connected to the image forming apparatus 14a, and allow the image forming apparatus 14a to divide and generate PDF data and then preform printing.

As described above, according to the terminal device 12 or the cloud server 16 (information processing apparatus) of the present embodiment, the data processing unit 52 (extracting unit) extracts, as a common object, an object that is commonly referred to on a plurality of pages, from a files including data of a plurality of pages and positional information indicating a position of the data of the pages. Then, the data processing unit 52 (determining unit) determines whether to define the common object extracted by the extracting unit as an object to be commonly used on the plurality of pages or to define the common object on each of the pages. Further, the PDF generating unit 53 (reconstructing unit) reconstructs data by arranging the objects on the basis of a determination result obtained by the determining unit, and the communication unit 50 (transmitting unit) transmits the reconstructed data to the image forming apparatus 14. Therefore, when printing a PDF file, it is possible to start a printing process without holding all pieces of data in the storage, so that it is possible to reduce a waiting time of a user when receiving the PDF file and performing the printing process.

Furthermore, according to the terminal device 12 or the cloud server 16 of the present embodiment, the data processing unit 52 (determining unit) is able to change whether to define the object as a common object depending on a type of the object. Therefore, for example, it is possible to reduce a usage of a memory by not setting an object with a small size, an object that is routinely defined, and the like as the common object.

Moreover, according to the terminal device 12 or the cloud server 16 of the present embodiment, the data processing unit 52 (determining unit) is able to change a method of defining the common object depending on any of a size of the common object, contents of the common object, and a configuration of the transferring unit 45. Therefore, it is possible to appropriately handle various processing environments depending on the contents of the PDF file to be printed and the configuration of the image forming apparatus 14 that performs printing.

Furthermore, according to the terminal device 12 or the cloud server 16 of the present embodiment, the data processing unit 52 (determining unit) further includes a setting function to set a threshold for changing the method of defining the common object. Therefore, it is possible to set a size of print data depending on an instruction given by a user who uses the image forming apparatus 14.

Moreover, according to the terminal device 12 or the cloud server 16 of the present embodiment, the data processing unit 52 (determining unit) determines whether to arrange the common object in all of the pages where the common object is to be referred to, in only a page where the common object is to be referred to for the first time, or in a top page of the data. Therefore, it is possible to control a size of the file depending on a feature of the PDF file to be printed.

Furthermore, according to the image forming apparatus 14a of the modification of the embodiment, the communication unit 20 (receiving unit) receives a file that contains pieces of data of a plurality of pages and positional information indicating a position of the piece of data of each of the pages via the communication network (network) or the storage media 13 (recording medium). Then, the display/operation control unit 30a functions as the extracting unit that extracts, as a common object, an object that is commonly referred to by a plurality of pages, from the received file. Moreover, the display/operation control unit 30a functions as the determining unit that determines whether to define the common object extracted by the extracting unit as an object that is commonly used by a plurality of pages or to define the common object for each of the pages. Furthermore, the display/operation control unit 30a functions as the reconstructing unit that reconstructs data by arranging the objects on the basis of a determination result obtained by the determining unit. Moreover, the transferring unit 45 (printing unit) prints the reconstructed data. Therefore, the image forming apparatus 14a is able to perform a printing process by receiving the PDF file that is stored in the communication network 18 or the storage media 13.

Furthermore, according to the image forming system 10 (information processing system) of the present embodiment, the data processing unit 52 (extracting unit) extracts, as a common object, an object that is commonly referred to by a plurality of pages from a file that contains pieces of data of a plurality of pages and positional information indicating a position of the piece of data of each of the pages. Then, the data processing unit 52 (determining unit) determines whether to define the common object extracted by the extracting unit as an object that is commonly used by a plurality of pages or to define the common object for each of the pages. Moreover, the PDF generating unit 53 (reconstructing unit) reconstructs data by arranging the objects on the basis of a determination result obtained by the determining unit, and the communication unit 50 (transmitting unit) transmits the reconstructed data to the image forming apparatus 14. Then, the communication unit 20 (receiving unit) of the image forming apparatus 14 receives the reconstructed data, and the transferring unit 45 (printing unit) performs printing. Therefore, when printing a PDF file, it is possible to start a printing process without holding all pieces of data in the storage, so that it is possible to reduce a waiting time of a user when receiving the PDF file and performing the printing process.

While the embodiment of the present invention has been described above, the embodiment as described above is presented by way of example, and does not limit the scope of the present invention. The inventive embodiment as described above may be embodied in various other forms. Further, various omission, replacement, and modifications of the components may be made without departing from the gist of the present invention. Moreover, the embodiment is included in the scope and the gist of the invention, included in the invention described in the appended claims, and included in the equivalent of the invention described in the appended claims.

According to the present invention, when printing a PDF file, it is possible to start a printing process without holding all pieces of data in a storage. Further, by changing a method of defining a resource, such as a font, a color space, or an image object, depending on contents of a PDF file, it is possible to prevent a reduction in a printing speed due to an increase in a data size.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus, comprising:
   circuitry configured to:
      extract, as a common object, a particular object commonly referred to on multiple pages of a plurality of pages of a document, from a file including data of the plurality of pages of the document and positional information indicating positions of the data of the plurality of pages of the document;
      determine whether to (1) define the extracted common object on one of the multiple pages as an object to be commonly used on the multiple pages, or (2) define the extracted common object on each of the multiple pages;
      reconstruct the data of the plurality of pages of the document by arranging the extracted common object within the multiple pages based on a result of the determining; and
      transmit the reconstructed data to an image forming apparatus.

2. The information processing apparatus according to claim 1, wherein the circuitry is further configured to, in the determining, define the particular object as the common object depending on a type of the particular object.

3. The information processing apparatus according to claim 1, wherein the circuitry is further configured to, in the determining, define the particular object as the common object depending on at least one of a size of the particular object, contents of the particular object, and a configuration of the image forming apparatus.

4. The information processing apparatus according to claim 3, wherein the circuitry is further configured to, in the determining, set a threshold for defining the particular object as the common object.

5. The information processing apparatus according to claim 1, wherein the circuitry is further configured to, in the determining, determine whether to arrange the common object in those pages where the common object is to be referred to, in only a particular page where the common object is to be referred to for a first time, or in a top page of the data.

6. The information processing apparatus of claim 1, wherein the circuitry is further configured to extract the common object from the data of the plurality of pages of the document, which is a document formatted in a printer language.

7. The information processing apparatus of claim 1, wherein the circuitry is further configured to extract the common object from the data of the plurality of pages of the document, which is a portable document format (PDF) document.

8. An image forming apparatus, comprising:
   circuitry configured to
      receive, via a network or a recording medium, a file including data of a plurality of pages of a document and positional information indicating positions of the data of the plurality of pages of the document;
      extract, from the received file, as a common object, a particular object commonly referred to on multiple pages of the plurality of pages of the document;
      determine whether to (1) define the extracted common object on one of the multiple pages as an object to be commonly used on the multiple pages, or (2) a define the extracted common object on each of the multiple pages;
      reconstruct the data of the plurality of pages by arranging the extracted common object within the multiple pages based on a result of the determining; and
      print the reconstructed data.

9. A non-transitory computer-readable medium including program instructions that cause circuitry of an information processing apparatus to execute a method, comprising:
   extracting, as a common object, a particular object commonly referred to on multiple pages of a plurality of pages of a document, from a file including data of the plurality of pages of the document and positional information indicating positions of the data of the plurality of pages of the document;
   determining whether to (1) define the extracted common object on one of the multiple pages as an object to be commonly used on the multiple pages, or (2) a define the extracted common object on each of the multiple pages;
   reconstructing the data of the plurality of pages by arranging the extracted common object within the multiple pages based on a result of the determining; and transmitting the reconstructed data to an image forming apparatus.

* * * * *